United States Patent [19]
Redden

[11] Patent Number: 5,934,866
[45] Date of Patent: Aug. 10, 1999

[54] PLATE FEEDER APPARATUS

[75] Inventor: Galen H. Redden, Gypsum, Kans.

[73] Assignee: Gelco International L.L.C., Kansas City, Kans.

[21] Appl. No.: 08/812,372

[22] Filed: Mar. 5, 1997

Related U.S. Application Data

[60] Provisional application No. 60/036,311, Jan. 30, 1997.

[51] Int. Cl.$^6$ .................................................. B65G 59/00
[52] U.S. Cl. .................. 414/798.9; 414/797; 414/797.3; 414/907; 198/577; 221/39; 271/150; 271/31.1
[58] Field of Search .............................. 414/798.6, 798.9, 414/797.3, 907, 798.5, 796.6, 797; 221/211, 222, 39; 271/150, 152, 155, 94, 31.1, 31; 198/577

[56] References Cited

U.S. PATENT DOCUMENTS

| | | | |
|---|---|---|---|
| 3,240,488 | 3/1966 | Lyman | 271/62 |
| 3,718,217 | 2/1973 | Stobb et al. | 271/31.1 |
| 4,407,063 | 10/1983 | Johnson . | |
| 4,462,745 | 7/1984 | Johnson et al. . | |
| 4,710,089 | 12/1987 | Schneider | 414/797.3 |
| 4,757,985 | 7/1988 | Hamant et al. | 271/31.1 |
| 4,758,126 | 7/1988 | Johnson et al. . | |
| 4,822,234 | 4/1989 | Johnson et al. . | |
| 4,824,307 | 4/1989 | Johnson et al. . | |
| 4,824,308 | 4/1989 | Carboniero et al. | 414/797.3 |
| 4,867,432 | 9/1989 | Matta | 271/150 |
| 5,104,111 | 4/1992 | Matsuda et al. | 271/110 |
| 5,131,899 | 7/1992 | Nagahashi et al. | 271/150 |
| 5,215,428 | 6/1993 | Masini | 414/907 |
| 5,289,666 | 3/1994 | Hamilton | 221/39 |
| 5,379,992 | 1/1995 | Holmes et al. | 271/31.1 |
| 5,511,936 | 4/1996 | Goldkuhle | 414/797 |

FOREIGN PATENT DOCUMENTS

| | | | |
|---|---|---|---|
| 0676137 | 3/1966 | Belgium | 414/797.3 |
| 63-8162 | 1/1988 | Japan | 271/150 |
| 2198711 | 6/1988 | United Kingdom | 271/31.1 |
| 88-01598 | 3/1988 | WIPO | 271/31.1 |

Primary Examiner—David A. Bucci
Assistant Examiner—Douglas Hess
Attorney, Agent, or Firm—Hovey, Williams, Timmons & Collins

[57] ABSTRACT

A plate handling apparatus (10) including a plate feeder (12) for sequentially advancing a stack of plates (11) and a pick-up assembly (14) for successively removing the forwardmost plate from the stack is disclosed. The plate feeder (12) includes a conveyor (18), a pair of clutches (22,24), and a crank assembly (26) for moving the stack a first distance toward the pick-up assembly and for subsequently moving the stack a second, slightly shorter distance away from the pick-up assembly before the pick-up assembly removes the forwardmost plate from the stack. This consecutively feeds the stack of plates towards the pick-up assembly so that the forwardmost plate in the stack can be removed from the stack by the pick-up assembly. This also provides a gap between the stack of plates and the pick-up assembly immediately before the pick-up assembly removes the forwardmost plate from the stack for preventing the removed plate from striking the remaining plates in the stack.

24 Claims, 5 Drawing Sheets

PLATE FEEDER APPARATUS

RELATED APPLICATIONS

Applicant claims the priority benefit under 35 U.S.C. §119(e) of U.S. Provisional Application Ser. No. 60/036, 311, filed Jan. 30, 1997 and entitled MAGAZINE FEEDER SINGULATOR HEAD APPARATUS. This Provisional Application is incorporated into the present application by reference.

BACKGROUND OF THE INVENTION

1. Field of the Invention

The present invention relates to a plate handling apparatus having an improved plate feeder for sequentially feeding a stack of plates to a pick-up assembly. More particularly, the invention relates to a plate feeder that creates a gap between the stack of plates and the pick-up assembly during rotation of the pick-up assembly so that the forwardmost plate in the stack does not strike the remaining plates in the stack as it is removed and rotated away from the stack by the pick-up assembly.

2. Description of the Prior Art

Many industrial operations require that individual plates be removed from a stack and delivered serially to another location for processing. For example, lead plates used in the production of lead acid storage batteries are typically stacked during their manufacture. The plates in the stack must be individually removed from the stack for enveloping each plate in insulative material.

Plate handling devices including feeder mechanisms that sequentially feed a stack of plates to a pick-up assembly are commonly used for this purpose. The pick-up assemblies typically include a rotating vacuum cylinder that pulls the forwardmost plate from the stack during each rotation of the cylinder.

A significant problem with this type of rotating vacuum cylinder is that after it removes a plate from a stack, the trailing edge of the removed plate often strikes the remaining plates in the stack as the vacuum cylinder continues to rotate. This disorients the remaining plates in the stack and often dislodges the removed plate from the vacuum cylinder.

Accordingly, it is advantageous to create a gap between the stack of plates and the pick-up assembly before the rotating vacuum cylinder removes a plate from the stack. One common method for accomplishing this is to equip the vacuum cylinder with at least one outwardly extending roller or lever positioned ahead of the pick-up snout on the cylinder. The roller or lever contacts the frontmost plate in the stack and pushes the stack of plates rearward immediately before the snout removes the forwardmost plate from the stack. Unfortunately, these rollers or levers exert a significant amount of force on the front faces of the plates and therefore often damage the plates during their removal.

OBJECTS AND SUMMARY OF THE INVENTION

In view of the foregoing, it is an object of the present invention to provide an improved plate handling apparatus that does not suffer from the limitations discussed above.

It is a more particular object of the present invention to provide a plate handling apparatus having an improved plate feeder that more effectively creates a gap between the stack of plates and the pick-up assembly before the vacuum cylinder of the pick-up assembly removes the forwardmost plate from the stack.

It is another object of the present invention to provide a plate feeder that achieves such a gap without making physical contact with the front faces of the plates in the stack.

The present invention achieves these objects and other objects that become evident from the description of the preferred embodiments of the invention herein by providing an improved plate handling apparatus. The plate handling apparatus broadly includes a plate feeder for holding and sequentially advancing a stack of plates and a pick-up assembly including a vacuum snout for successively removing the forwardmost plate from the stack and depositing the removed plate on a conveyor or other transport device.

In accordance with the present invention, the plate feeder includes means for moving the stack a first distance toward the pick-up assembly and for subsequently moving the stack a second, slightly shorter distance away from the pick-up assembly before the snout removes the forwardmost plate from the stack. The differential between the first and second distances is approximately equal to the thickness of the removed plate.

This consecutively feeds the stack of plates toward the pick-up assembly so that the forwardmost plate in the stack can be removed from the stack. This also provides the necessary gap between the stack of plates and the pick-up assembly immediately before the snout of the pick-up assembly removes the forwardmost plate from the stack, thus preventing the removed plate from striking the remaining plates in the stack.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figures 6, 7:
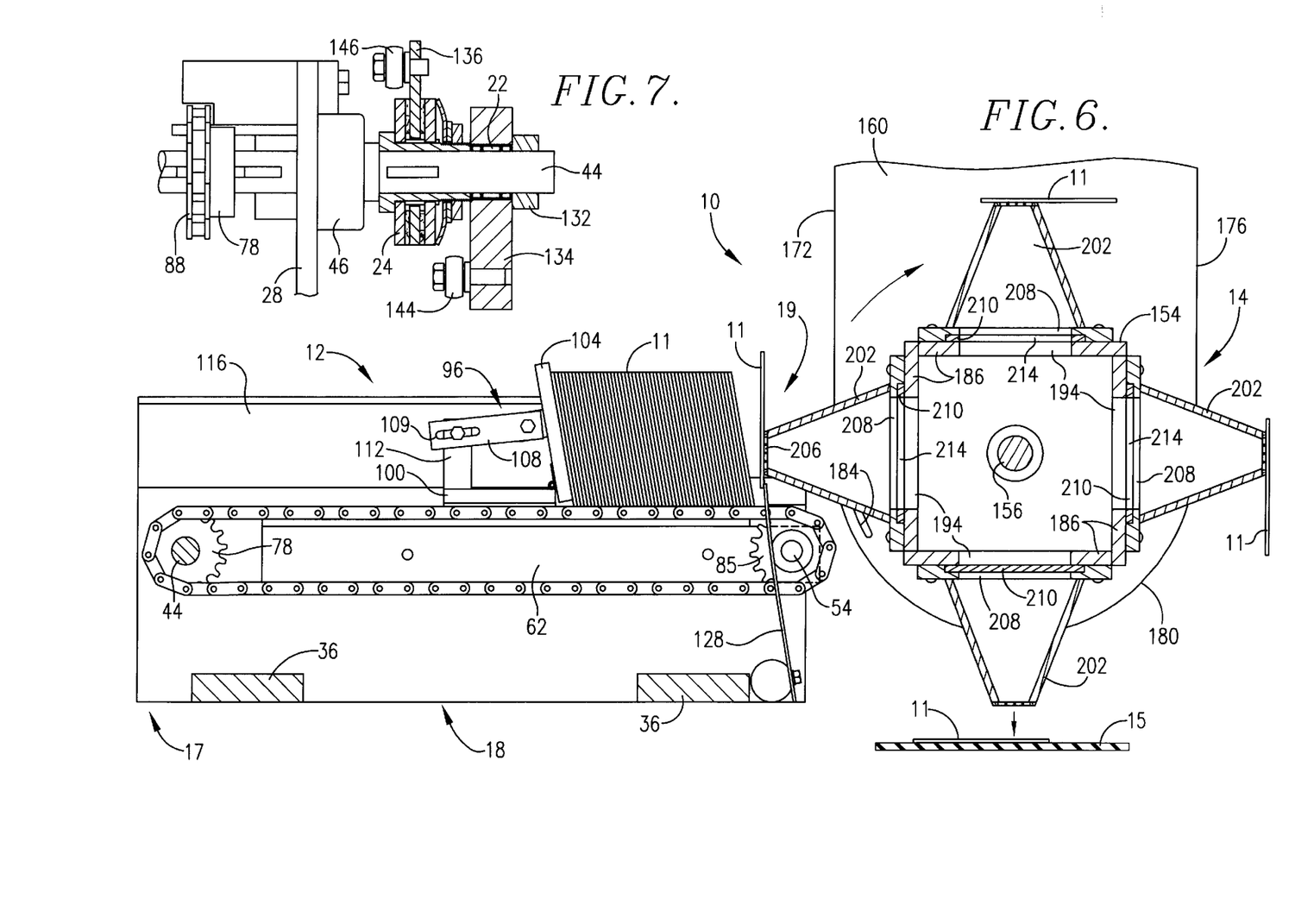
FIG. 6 is a longitudinal, vertical section view of the plate handling apparatus.
FIG. 7 is a fragmented end view in partial section of the clutches and drive shaft of the plate feeder.

The drawing figures illustrate a plate handling apparatus 10 constructed in accordance with a preferred embodiment of the invention. As best illustrated in FIG. 6, the plate handling apparatus 10 is configured for handling at least one stack of vertically oriented plates 11 such as lead plates used in the construction of lead acid batteries and broadly includes a plate feeder assembly 12 and a pickup assembly 14.

The plate feeder 12 and pickup assembly 14 are preferably both driven by a primary drive shaft 16 (FIG. 3) which is coupled with a conventional AC motor (not shown). The motor is preferably coupled with a variable frequency drive or inverter so that the speed of the plate feeder 12 and pickup assembly 14 can be selectively adjusted. In general, the plate feeder 12 holds and sequentially feeds at least one stack of plates 11 towards the pickup assembly 14. The pickup assembly 14 successively picks or removes the forwardmost plate from each plate stack 11 and then drops the removed plates one at a time onto a conveyor 15 (FIG. 6), which carries the plates to other processing stations.

Figure 3:
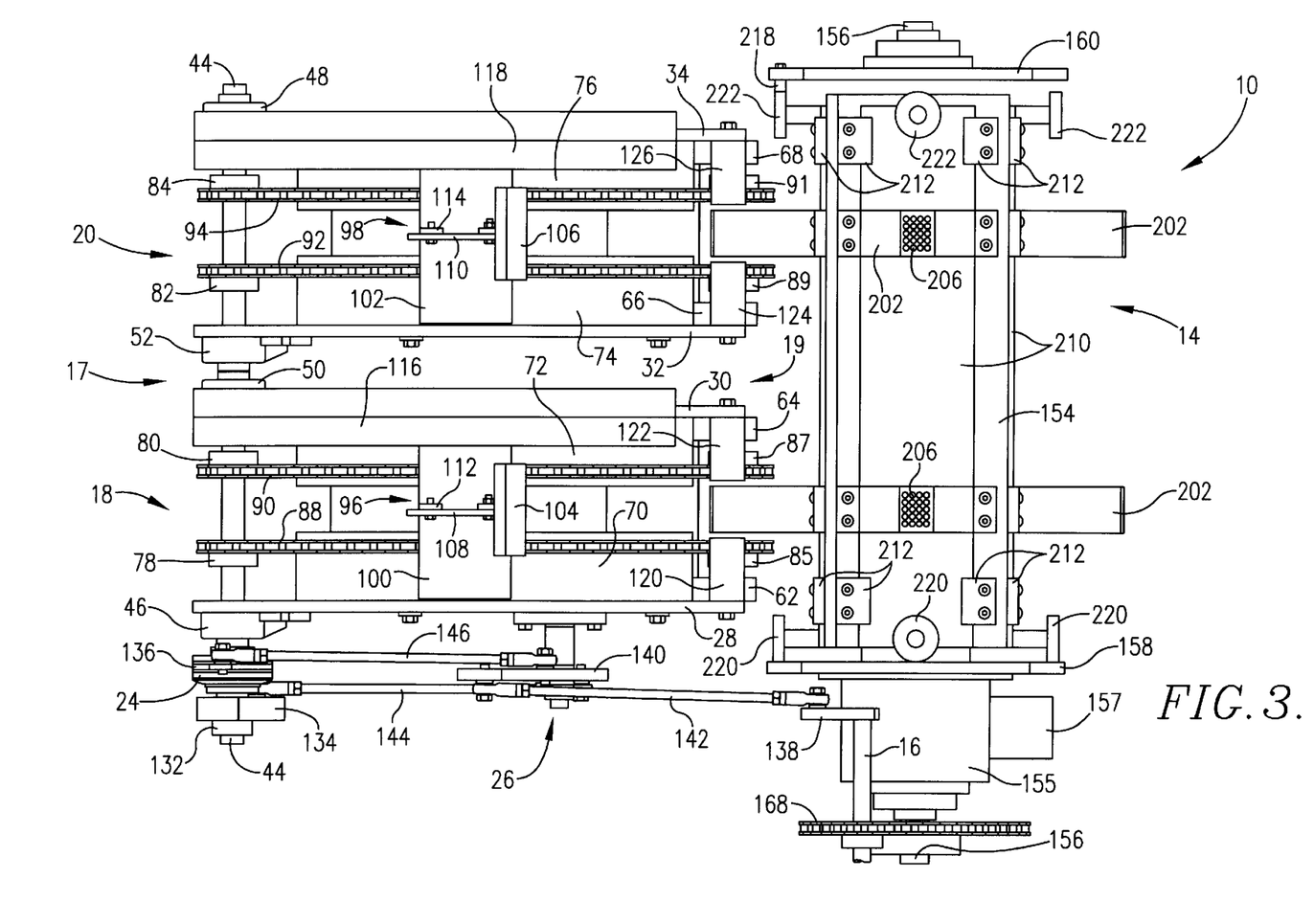
FIG. 3 is a top view of the plate handling apparatus.

In more detail, the plate feeder 12 has an inlet side 17 and an outlet side 19. As best illustrated in FIG. 3, the plate feeder 12 preferably includes a pair of side-by-side conveyor assemblies 18,20, a one-way clutch 22 and a friction clutch 24 operably coupled with the conveyor assemblies, and a crank assembly generally referred to by the numeral 26 operably coupled between the clutches 22,24 and the primary drive shaft 16 for driving the conveyor assemblies.

Figure 1:
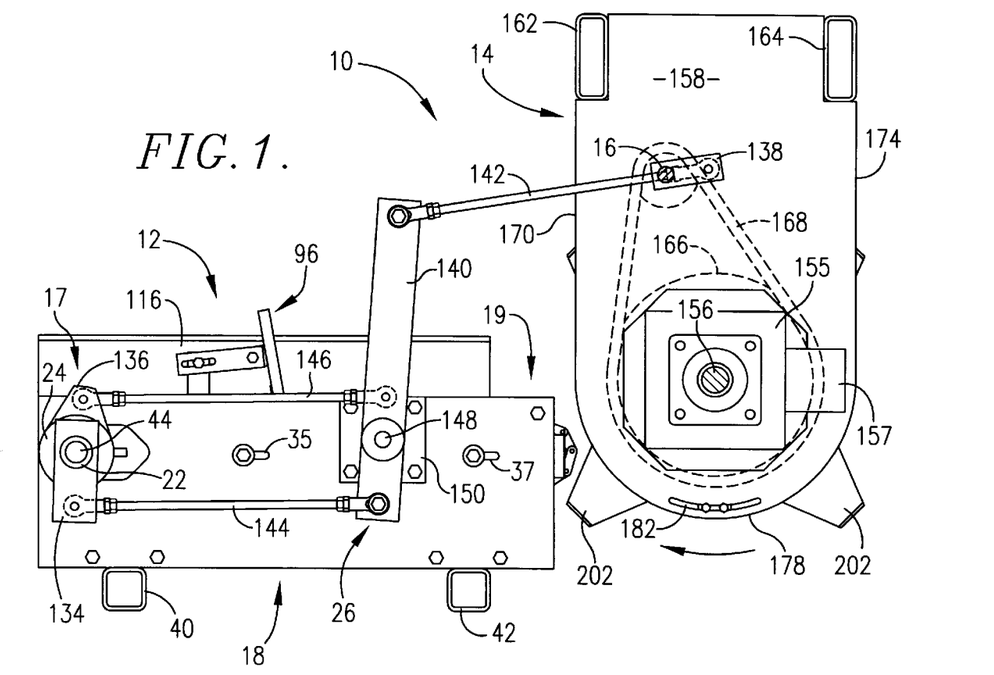
FIG. 1 is a side elevational view of a plate handling apparatus constructed in accordance with a preferred embodiment of the invention and illustrating the plate pusher of the plate feeder in its forwardmost position.
Figure 4:
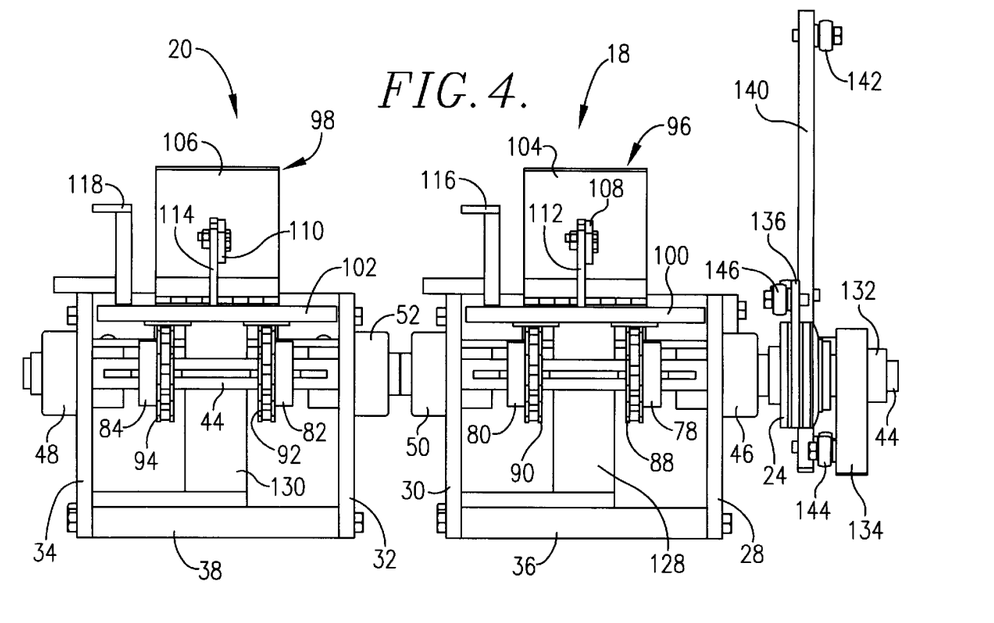
FIG. 4 is an end elevational view of the inlet side of the plate feeder.

Referring to FIG. 4, the conveyor assemblies 18,20 are substantially identical and each includes a pair of spaced-apart vertically extending side plates 28,30 and 32,34. Each of the side plates includes a pair of horizontally-extending adjustment slots 35,37 (FIG. 1). Each pair of side plates is connected by a horizontally extending cross member 36,38 that is supported on a pair of horizontally extending support beams 40,42 (see FIG. 1).

A rotatable, horizontally extending conveyor drive shaft 44 extends across the inlet side 17 of the conveyor assemblies 18,20 through the side plates 28,30,32,34. The ends of the conveyor drive shaft 44 are journaled to the outermost side plates 28,34 by bearings 46,48, and the mid-point of the drive shaft is journaled between the inside side plates 30,32 of the conveyor assemblies by bearings 50,52. The rightmost end of the drive shaft extends a short distance beyond the side plate 28.

Figure 5:
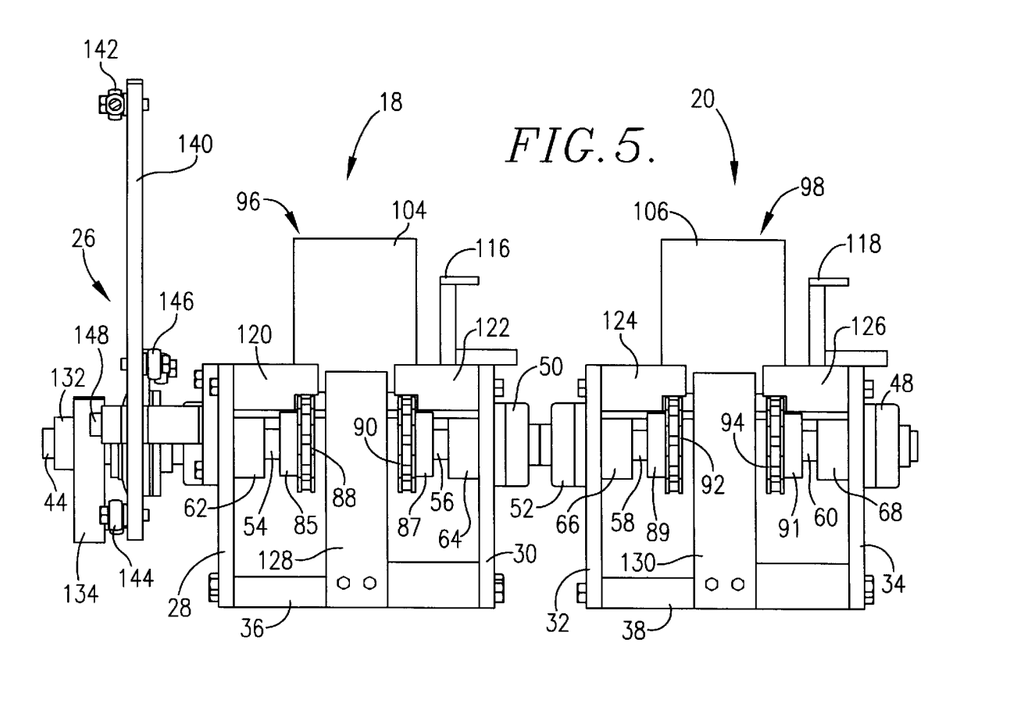
FIG. 5 is an end elevational view of the outlet side of the plate feeder.

As best illustrated in FIG. 5, each conveyor assembly 18,20 also includes a pair of rotatable idler shafts 54,56 and 58,60 at the outlet side 19 of the plate feeder. Each idler shaft is mounted to an elongated chain tensioning bar 62,64,66,68 that extends across substantially the entire length of its conveyor assembly 18,20. Each tensioning bar is mounted to one corresponding side plate 28,30,32,34 by bolts extending through the adjustment slots 35,37. A horizontally extending support plate 70,72,74,76 is mounted atop each tensioning bar.

A pair of spaced drive sprockets 78,80 and 82,84 are mounted on each section of the conveyor drive shaft 44. A corresponding pair of idler sprockets 85,87 and 89,91 are mounted on the idler shafts 54,56 and 58,60.

A conveyor chain 88,90,92,94 is trained over each set of drive and idler sprockets. The undersides of the chains rest loosely on the top surfaces of their respective support plates 70,62,74,76. The tension on the chains may be adjusted by moving the tensioning bars in the adjustment slots 35,37 of their respective side plate 28,30,32,34. The chains preferably have straight side links so that they slide easily over the chain support plates.

Each conveyor assembly also includes a plate pusher assembly 96,98 that supports the stack of plates 11 in an upright position on the conveyor chains 88,90,92,94. As best illustrated in FIGS. 3 and 6, each pusher assembly 96,98 includes a horizontally extending base plate 100,102 that rides on the conveyor chains and an upstanding pusher plate 104,106 that is hingedly connected to its base plate. An adjustment bracket 108,110 having an adjustment slot 109 therein connects the pusher plate to an upstanding support column 112,114 on the base plate. The angle of the pusher plate relative to the base plate may be adjusted by sliding the adjustment slot 109 relative to the support column to accommodate different sizes and shapes of plates.

An elongated, upstanding plate alignment guide 116,118 (FIGS. 3 and 4) is mounted to the left side plate 30,34 of each conveyor assembly 18,20 for use in aligning the plates 11 on the conveyor assembly. Each conveyor assembly also includes a pair of stops 120,122 and 124,126 (FIG. 5) each mounted to one of the side plates 28,30,32,34 at the outlet end 19 of the plate feeder. The stops serve as benchmarks to stop the forward movement of the plates 11 on the conveyor chains 88,90,92,94.

As best illustrated in FIGS. 5 and 6, an elongated spring steel tongue 128,130 is mounted to the outlet side of each conveyor assembly 18,20. Each tongue extends upwardly between its idler sprockets 85,87,89,91 and terminates between its benchmark stops 120,122,124,126. The tongues urge the stacks of plates 11 slightly rearward to prevent the pickup assembly 14 from striking the forwardmost plates in the stacks during plate pickup.

Referring to FIGS. 4 and 7, the one-way clutch 22 and friction clutch 24 are mounted to the end of the conveyor drive shaft 44 that extends beyond the side plate 28. The clutches are secured on the drive shaft by a removable collar 132. The one-way clutch 22 includes a downwardly extending clutch arm 134, and the friction clutch 24 includes an upstanding clutch arm 136.

Figure 2:
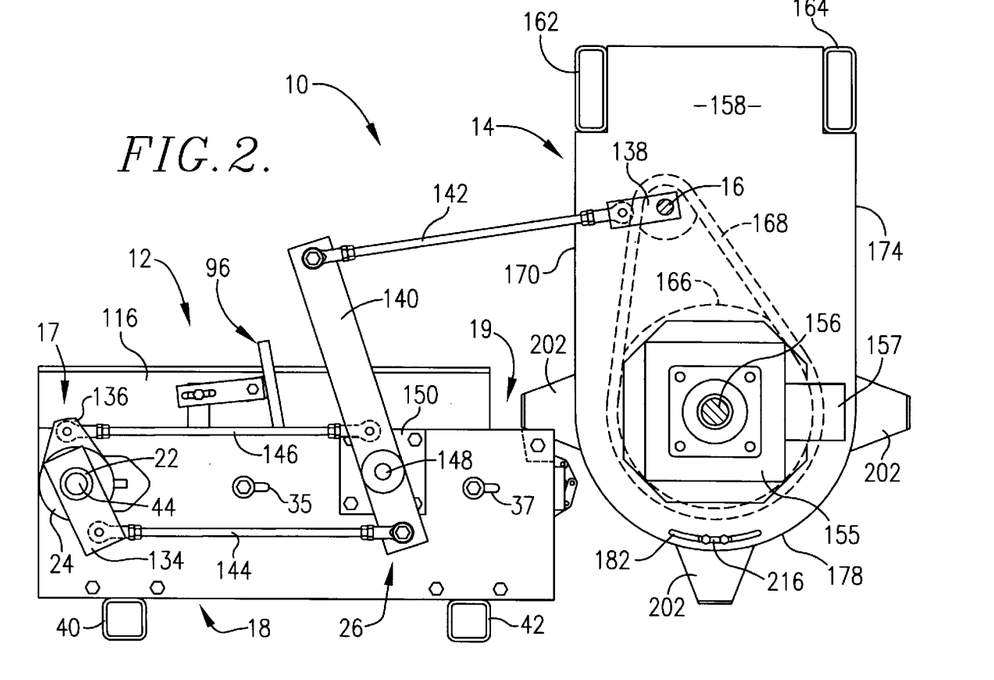
FIG. 2 is a side elevational view of the plate handling apparatus illustrating the plate pusher of the plate feeder in its rearwardmost position.

As best illustrated in FIGS. 1 and 2, the crank assembly 26 is operably coupled between the clutches 22,24 and the primary drive shaft 16 for reciprocating the conveyor drive shaft 44 during rotation of the primary drive shaft. The crank assembly includes a crank 138 rotatably coupled with the primary drive shaft, a ratio bar 140, and a plurality of tie rods 142,144,146 interconnecting the crank, ratio bar, and clutches.

The ratio bar 140 is an elongated, generally vertically extending, flat bar that is pivotally mounted to the side plate 28 of the conveyor assembly 18 by a pivot bearing 148. The pivot bearing is supported on a mounting bracket 150 attached to the side plate 28. The upper end of the ratio bar is connected with the crank 138 by the tie rod 142. The tie rod 142 reciprocates the ratio bar about its pivot axis 148 as the crank is rotated by the primary drive shaft 16.

The lower end of the ratio bar 140 is operably coupled with the arm 134 of the one-way clutch 22 by the tie rod 144. The section of the ratio bar above its pivot axis 148 is operably coupled with the arm 136 of the friction clutch 24 by the tie rod 146. The one-way clutch tie rod 144 is mounted further from the pivot axis 148 of the ratio bar than is the one-way clutch tie rod 144. However, the one-way clutch tie rod 144 and friction clutch tie rod 146 are equidistant from the axis of the conveyor drive shaft 44. The importance of this mounting arrangement is discussed below.

The pickup assembly 14, which is best illustrated in FIGS. 3 and 6, includes a rotatable vacuum head 154 mounted on a vacuum head drive shaft 156. The vacuum head is connected to a vacuum chamber 155 which is coupled with a suitable source of vacuum by a vacuum supply port 157.

The vacuum head drive shaft 156 is journaled between a pair of spaced apart, vertically extending support plates 158,160 that depend from a pair of horizontally-extending support beams 162,164 (see FIG. 1). One end of the vacuum head drive shaft is attached to a drive sprocket 166 that is coupled with the primary drive shaft 16 by a drive chain 168.

Each support plate 158,160 includes vertically-extending front 170,172 and rear 174,176 walls and an arcuate lower wall 178,180 (FIGS. 1,6). As illustrated in FIGS. 1 and 2, the support plate 158 includes a horizontally extending, arcuate adjustment slot 182 positioned along the periphery of its arcuate lower wall 178. Similarly, as illustrated in FIG. 6, the support plate 160 includes an arcuate, upwardly extending adjustment slot 184 positioned along the periphery of the intersection of its front wall 172 and its arcuate lower wall 180. The purpose of the adjustment slots is discussed below.

The vacuum head 154 is preferably square in cross-section and includes four side plates 186 (FIG. 6). Each side plate has a pair of longitudinally spaced vacuum slots or openings 194 therein (only one vacuum slot being shown for each side plate). The purpose of the vacuum slots is discussed below.

The pick up assembly 14 also includes at least two outwardly extending pickup snouts 202 mounted to one of the vacuum head side plates 186. The two pickup snouts are longitudinally spaced on the side plate so that each one rotates between the conveyor chains 88,90,92,94 of one of the conveyor assemblies 18,20. In preferred forms, the pickup assembly includes a set of four pickup snouts spaced equally along the periphery of the vacuum head for each conveyor assembly.

The pickup snouts are each generally hollow and trapezoidal in cross section. As best illustrated in FIG. 3, the outwardly extending end of each snout has a plurality of air holes 206 therein. Returning to FIG. 6, the base of each snout has a vacuum slot 208 therein that is in alignment with one of the vacuum slots 194 of its respective side plate 186.

The pickup assembly 14 also includes valve structure interposed between each pickup snout 202 and its respective vacuum head side plate 186 for controlling the introduction of vacuum pressure to the pickup snout. The preferred valve structure includes a plurality of elongated, flat valve plates 210 (FIG. 3) that are each slidably mounted between one vacuum head side plate 186 and its associated snout 202 by a plurality of clips 212. As depicted on the upper three snouts of FIG. 6, each valve plate includes a pair (only one being shown) of longitudinally spaced vacuum slots 214 therein.

Each valve plate 210 is shiftable between an open position wherein it is shifted toward the primary drive shaft 16 and a closed position wherein it is shifted away from the primary drive shaft. When a valve plate 210 is shifted to its open position, its vacuum slots 214 are in substantial alignment with their corresponding side plate vacuum slots 194 and snout vacuum slots 208 as depicted by the upper three snouts of FIG. 6. Thus, when a valve plate is open and vacuum pressure is introduced to the vacuum head 154, the vacuum pressure is transferred to the snouts 202 through the vacuum slots 194,208,214 and to the air holes 206 in the ends of the snouts 202. This enables each snout 202 to pick up and hold a plate as described below.

However, when a valve plate 210 is shifted to its closed position, its vacuum slots 214 are shifted out of alignment with their corresponding slide plate vacuum slots 194 and snout vacuum slots 208 as depicted by the lowermost snout of FIG. 6. This cuts off the vacuum pressure from the vacuum head to the snouts so that the snouts release the plates onto the conveyor 15.

The valve plates 210 are shifted between their opened and closed positions during rotation of the vacuum head 154 by camming action. Specifically, the pick-up assembly 14 includes a first, ramp-shaped cam 216 mounted in the adjustment slot 182 on the support plate 158, and a second ramp-shaped cam 218 mounted in the adjustment slot 184 on the support plate 160. The cams can be positioned anywhere along the length of their respective adjustment slots.

As best illustrated in FIG. 3, a pair of corresponding cam follower rollers 220,222 are mounted to the ends of each slidable valve plate 210. The rollers are strategically positioned so that they each contact one of the cams 216,218 during rotation of the vacuum head for shifting their corresponding valve plates 210 between their open and closed positions.

For example, as the roller 222 passes by the cam 218, the cam shifts the roller and its corresponding valve plate 210 toward the primary drive shaft 16 as viewed from FIG. 3. This aligns the vacuum slots 194,208,214 and therefore transfers vacuum pressure from the vacuum head to the corresponding snouts 202. Conversely, as the roller 220 passes by the cam 216, the cam shifts the roller and its corresponding valve plate 210 away from the primary drive shaft 16 as viewed from FIG. 3. This shifts the vacuum slots 214 out of alignment with the vacuum slots 194,208 and therefore disconnects the vacuum pressure from the snouts.

OPERATION

An operator begins a plate handling operation by first turning the drive motor on and adjusting the speed of the motor with the variable frequency drive. The motor rotates the primary drive shaft 16, which in turn rotates the vacuum head 154 and reciprocates the ratio bar 140 of the crank assembly 26. Once the plate feeder 12 and pick-up assembly 14 are operating at their desired speed, the operator places a stack of plates 11 and a pusher assembly 96,98 on one or both of the conveyor assemblies 18,20. The speed of the primary drive shaft can be varied and additional plates can be added to the stack 11 at any time during operation of the apparatus.

The primary drive shaft 16 and crank 138 reciprocate the ratio bar 140 about its pivot axis. The ratio bar in turn alternately rotates the clutches 22,24 clockwise and then counterclockwise as viewed from FIGS. 1 and 2 for rotating the conveyor drive shaft 44. The conveyor drive shaft 44 in turn moves the conveyor chains 88,90,92,94 and pusher assemblies 96,98 toward or away from the pick-up snouts 202.

Specifically, when the top of the ratio bar 140 is shifted rightward as illustrated in FIG. 1, it rotates the clutch arms 134,136 and their associated clutches 22,24 in a clockwise direction. The clutches in turn rotate the conveyor drive shaft 44 in a clockwise direction and move the conveyor chains 88,90,92,94 and the corresponding pusher assemblies 96,98 forward a first distance toward the pick-up assembly. Since the one-way clutch tie rod 144 is spaced further from the ratio bar pivot axis 148 than is the friction clutch tie rod 146, the one way clutch 22 and drive shaft 44 rotate clockwise slightly faster than the friction clutch 24. This causes the friction clutch to slip slightly on the conveyor drive shaft 44.

Then, when the top of the ratio bar 140 is shifted leftward as illustrated in FIG. 2, it rotates the friction clutch 24 in a counterclockwise direction. The friction clutch, which does not slip during counterclockwise rotation, in turn rotates the conveyor drive shaft 44 in a counterclockwise direction to move the conveyor chains 88,90,92,94 and pusher assemblies 96,98 rearward a second distance away from the pick-up assembly 14. As the ratio bar moves the one-way clutch mounting arm 134 counterclockwise, the one-way clutch 22 freely rotates on the conveyor drive shaft.

Since the one-way clutch tie rod 144 is spaced further from the ratio bar pivot axis 148 than is the friction clutch tie rod 146, the friction clutch 24 rotates the conveyor drive shaft 44 counterclockwise a distance which is less than the clockwise travel of the conveyor drive shaft. This causes the pusher assemblies 96,98 to be moved forward toward the pick-up assembly 14 a greater distance than they are moved away from the pickup assembly. The importance of this travel differential is discussed below. The distance differential can be conveniently adjusted by repositioning either the friction clutch tie rod 146 or the one-way clutch tie rod 144 relative to the pivot axis 148 of the ratio bar.

While the feeder assembly 12 shifts the stack of plates 11 toward and away from the pick-up assembly 14, the primary drive shaft 16 also rotates the vacuum head 154 and its associated snouts 202 between the conveyor chains. The snouts are valved as described above so that they are connected to the vacuum pressure as they rotate in front of the plates 11 and then disconnected from the vacuum pressure as they pass over the conveyor assembly 15. This permits each snout to remove the forwardmost plate from its associated stack as it passes thereby, hold the removed plate as the vacuum head continues to rotate, and then release the plate over the conveyor 15.

In accordance with the present invention, the operation of the plate feeder 12 and pickup head 14 are sequenced so that the conveyor chains 88,90,92,94 and their associated pusher assemblies 96,98 are in their rearward most positions as the snouts 202 rotate in front of the stacks of plates 11. This permits a snout to remove the forwardmost plate from its corresponding stack and to continue to rotate by the stack without striking the tail end of the removed plate against the remaining plates in the stack. After the snouts 202 have passed by the stacks, the pusher assemblies 96,98 are then shifted to their forwardmost positions and then back to their rearwardmost positions before the next snouts arrive to remove the next forwardmost plates from the stacks. As mentioned above, the pusher assemblies are moved forward toward the pick-up assembly a greater distance than they are moved away from the pickup assembly. This accounts for the thickness of the removed plates so that the stacks are always positioned a predetermined distance from the pickup head regardless of how many plates have been removed.

This sequencing of the plate feeder 12 and pickup head 14 is best understood with reference to the schematic diagrams of FIGS. 8–11 which illustrate the operation of one conveyor assembly 18. The axis lines extending through the conveyor drive shaft 44 in these figures represent the axes of the clutch arms 134,136. The top axis line 224 represents the axis for the friction clutch, and the bottom axis line 226 represents the axis for the one-way clutch. The solid axis lines represent the actual position of the clutches for that particular figure, whereas the dashed lines represent the reference starting point for the clutches. The reference line 228 extending through the conveyor chain 88 near the idler sprocket 85 indicates the position of the chain in each of the figures.

Figure 8:
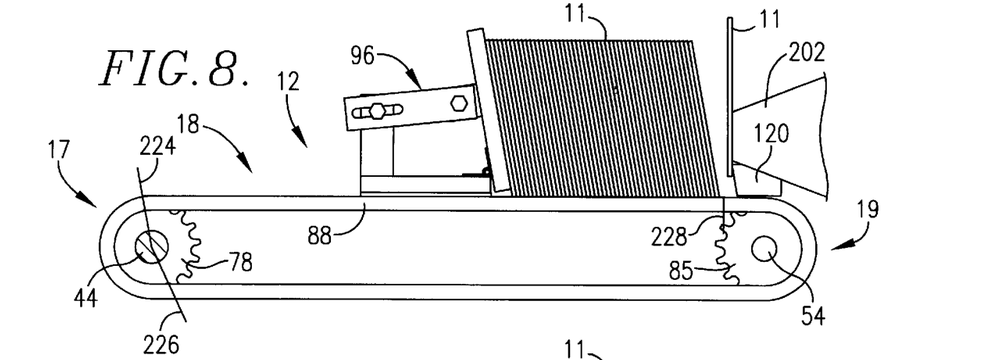
FIG. 8 is a schematic view illustrating one of the plate pushers in its rearwardmost position and depicting a pickup snout of the pickup assembly in phantom lines.

Initially, as illustrated in FIG. 8, the clutches are both shifted counterclockwise so that the pusher assembly 96 is moved away from the pick-up assembly 14. At the same time, the snouts 202 on the vacuum head 154 rotate in front of the stack 11 and remove the forwardmost plate from the stack.

Figures 9, 10:
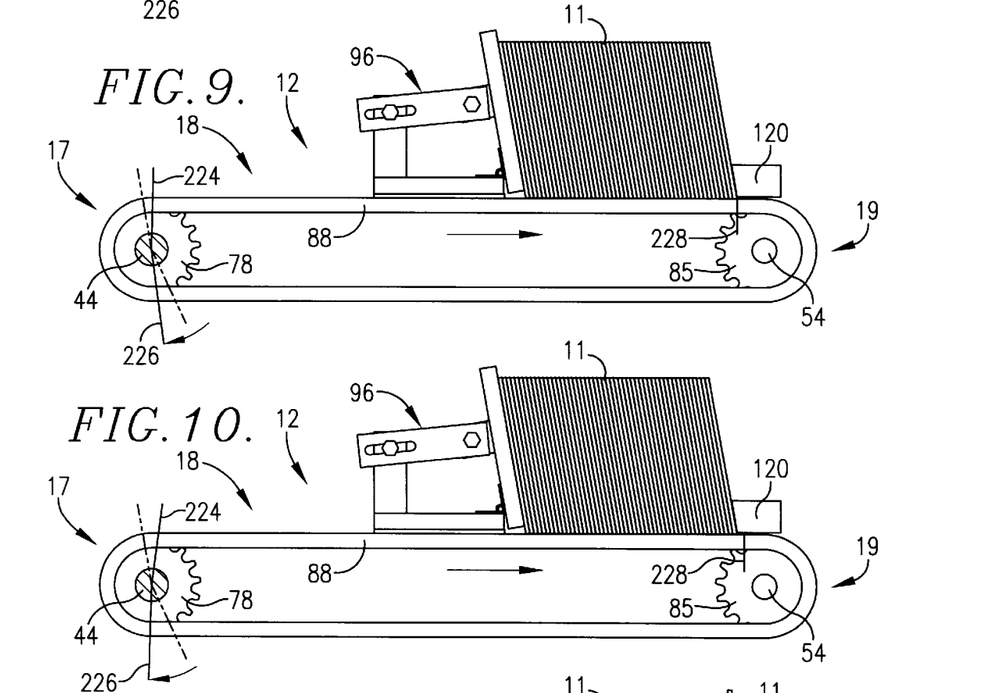
FIG. 9 is a schematic view illustrating the plate pusher in its forwardmost position while its corresponding drive chain continues to move forward.
FIG. 10 is a schematic view illustrating the plate pusher and its corresponding drive chain in their forwardmost positions.

Then, as the snouts 202 and removed plate rotate past the conveyor assembly 18, the clutches 22,24 and conveyor drive shaft 44 are both rotated clockwise to move the pusher assembly 96 forward against the benchmark stops 120,122 illustrated in FIG. 9. Once the forward motion of the pusher assembly has stopped, the one-way clutch 22, conveyor drive shaft 44, and conveyor chains 88,90 continue to rotate clockwise a short distance as illustrated by the bottom axis line 226 and reference line 228 in FIG. 10. During this movement, the chains merely slide under the pusher assembly 96 a short distance.

Figure 11:
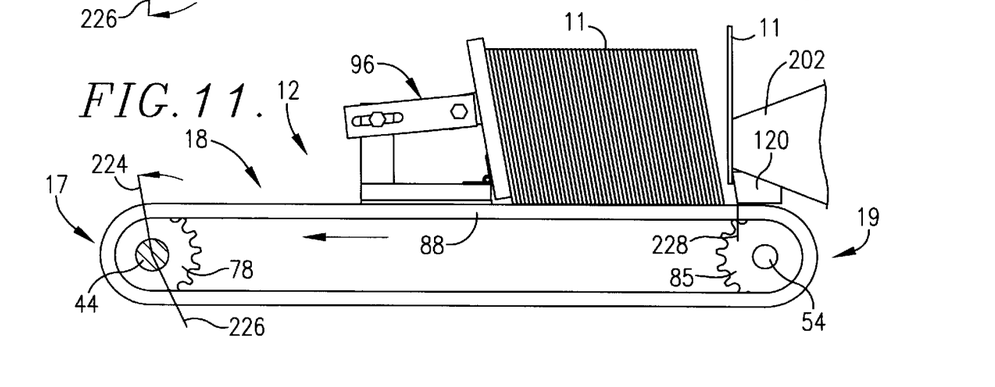
FIG. 11 is a schematic view illustrating the plate pusher returned to its rearwardmost position.

Finally, as illustrated in FIG. 11, the friction clutch arm 136 and the one-way clutch arm 134 are rotated counterclockwise to their starting positions so that the pusher assembly 96 is once again moved away from the pickup assembly 14. At the same time, another snout 202 is rotated in front of the stack 11 to remove the new forwardmost plate from the stack. At this point, however, the pusher assembly 96 is slightly closer to the pickup assembly than it was in FIG. 8 because the ratio bar 140 and clutches 22,24 moved the pusher assembly forward a greater distance than rearward. This distance differential accounts for the thickness of the removed plate.

Although the invention has been described with reference to the preferred embodiment illustrated in the attached drawing figures, it is noted that equivalents may be employed and substitutions made herein without departing from the scope of the invention as recited in the claims. For example, although the plate handling apparatus 10 of the present invention is preferably configured for handling stacks of vertically oriented lead plates 11 used in the construction of lead acid batteries, it may be used equally well with other types of generally flat plates. Similarly, although the preferred plate feeder 12 includes a pair of side-by-side conveyor assemblies 18,20, and the preferred vacuum head 154 includes snouts 202 for simultaneously removing plates from the two conveyor assemblies, the plate feeder and vacuum head may be equipped with any number of conveyor assemblies and pick-up snouts.

Having thus described the preferred embodiment of the invention, what is claimed as new and desired to be protected by Letters Patent includes the following:

1. A plate handling apparatus comprising:
   a plate feeder for holding and advancing a stack of plates; and
   a pick-up assembly operably coupled with the plate feeder for successively removing a forwardmost plate from the stack;
   the plate feeder including means for moving the stack a first distance toward the pick-up assembly and for subsequently moving the stack a second distance away from the pick-up assembly before the pick-up assembly removes the forwardmost plate from the stack.

2. The apparatus as set forth in claim 1, wherein the first distance is greater than the second distance to account for the removal of the forwardmost plate from the stack.

3. The apparatus as set forth in claim 1, wherein the stack moving means includes:
   a rotatable conveyor assembly for moving the stack toward and away from the pick-up assembly, the conveyor assembly including a conveyor drive shaft; and
   a crank assembly coupled with the conveyor drive shaft for rotating the conveyor drive shaft in a first direction for moving the stack the first distance toward the pick-up assembly and for subsequently rotating the conveyor drive shaft in a second direction for moving the stack the second distance away from the pick-up assembly.

4. The apparatus as set forth in claim 3, further including a one-way clutch and a friction clutch operably coupled with the conveyor drive shaft.

5. The apparatus as set forth in claim 4, further including a motor having a rotatable shaft for driving the crank assembly, wherein the crank assembly includes:
   a crank coupled with the motor shaft; and
   a ratio bar operably coupled between the crank and the clutches for rotating the one-way clutch and the friction clutch in the first direction and for subsequently rotating the friction clutch in the second direction.

6. The apparatus as set forth in claim 5, the ratio bar being pivotally mounted about a pivot axis, operably coupled with the crank by a first tie rod, operably coupled with the one-way clutch by a second tie rod, and operably coupled with the friction clutch by a third tie rod.

7. The apparatus as set forth in claim 3, the conveyor assembly further including at least one endless conveyor chain and a pair of spaced-apart sprockets for supporting and rotating the chain, one of the sprockets being coupled with the conveyor drive shaft.

8. The apparatus as set forth in claim 1, wherein the pick-up assembly includes:
   an elongated rotatable vacuum head including means for coupling with a source of vacuum pressure, the vacuum head including at least one vacuum slot therein;
   at least one pick-up snout extending outwardly from the vacuum head and including a vacuum slot in alignment with the vacuum head vacuum slot;
   valve structure interposed between the vacuum head vacuum slot and the snout vacuum slot, the valve structure being shiftable between an open position wherein the valve structure transfers the vacuum pressure from the vacuum head to the snout and a closed position wherein it disconnects the vacuum pressure from the snout; and
   means for shifting the valve structure between its open and closed positions during rotation of the vacuum head.

9. The apparatus as set forth in claim 8, wherein the shifting means includes:
   a plurality of stationary cams spaced adjacent the periphery of the vacuum head; and
   at least one cam follower mounted on the vacuum head and coupled with the valve structure, the cams and the cam follower being oriented so that the cam follower contacts the cams during rotation of the vacuum head for shifting the valve structure between its open and closed positions.

10. The apparatus as set forth in claim 9, the pick-up assembly including a plurality of snouts spaced around the periphery of the vacuum head.

11. A plate handling apparatus comprising:
    a plate feeder including a pusher assembly for holding and advancing a stack of plates; and
    a pick-up assembly operably coupled with the plate feeder for successively removing a forwardmost plate from the stack;
    the plate feeder further including:
      a rotatable conveyor assembly for supporting the pusher assembly, and
      a crank assembly for operating the conveyor assembly for moving the pusher assembly and stack a first distance toward the pick-up assembly and for subsequently moving the pusher assembly and the stack a second distance away from the pick-up assembly.

12. The apparatus as set forth in claim 11, wherein the first distance is greater than the second distance to consecutively account for the removal of the forwardmost plate from the stack.

13. The apparatus as set forth in claim 12, the conveyor assembly including a conveyor drive shaft, the apparatus further including a one-way clutch and a friction clutch operably coupled with the conveyor drive shaft.

14. The apparatus as set forth in claim 13, further including a motor including a rotatable shaft for driving the crank assembly, the crank assembly including:
    a crank coupled with the motor shaft; and
    a ratio bar operably coupled between the crank and the clutches for rotating the one-way clutch and the friction clutch in a first direction for moving the pusher assembly and the stack the first distance and for subsequently rotating the friction clutch in a second direction for moving the pusher assembly and the stack the second distance.

15. The apparatus as set forth in claim 14, the ratio bar being pivotally mounted about a pivot axis, operably coupled with the crank by a first tie rod, operably coupled with the one-way clutch by a second tie rod, and operably coupled with the friction clutch by a third tie rod.

16. The apparatus as set forth in claim 11, wherein the pick-up assembly includes:
    an elongated rotatable vacuum head including means for coupling with a source of vacuum pressure, the vacuum head including at least one vacuum slot therein;
    at least one pick-up snout extending outwardly from the vacuum head and including a vacuum slot in alignment with the vacuum head vacuum slot;
    valve structure interposed between the vacuum head vacuum slot and the snout vacuum slot, the valve structure being shiftable between an open position wherein the valve structure transfers the vacuum pressure from the vacuum head to the snout and a closed position wherein it disconnects the vacuum pressure from the snout; and
    means for shifting the valve structure between its open and closed positions during rotation of the vacuum head.

17. The apparatus as set forth in claim 16, wherein the shifting means includes:
    a plurality of stationary cams spaced adjacent the periphery of the vacuum head; and
    at least one cam follower mounted on the vacuum head and coupled with the valve structure, the cams and the cam follower being oriented so that the cam follower contacts the cams during rotation of the vacuum head for shifting the valve structure between its open and closed positions.

18. The apparatus as set forth in claim 16, wherein the pick-up assembly includes a plurality of snouts spaced around the periphery of the vacuum cylinder.

19. A plate feeder for use in a plate handling apparatus including a pick-up assembly having a rotatable vacuum head, the plate feeder comprising:
    a pusher assembly for holding a stack of plates; and
    means for moving the pusher assembly and stack a first distance toward the pick-up assembly and for subsequently moving the pusher assembly and the stack a second distance away from the pick-up assembly during rotation of the vacuum head for permitting the vacuum head to remove the forwardmost plate from the stack without striking the removed plate against the remaining plates in the stack.

20. The plate feeder as set forth in claim 19, wherein the first distance is greater than the second distance to account for the removal of the forwardmost plate from the stack.

21. The plate feeder as set forth in claim 19, wherein the moving means includes:
- a rotatable conveyor assembly operably coupled with the pusher assembly for moving the stack toward and away from the pick-up assembly, the conveyor assembly including a conveyor drive shaft, and
- a crank assembly coupled with the conveyor drive shaft for rotating the conveyor drive shaft in a first direction for moving the stack the first distance toward the pick-up assembly and for subsequently rotating the conveyor drive shaft in a second direction for moving the stack the second distance away from the pick-up assembly.

22. The plate feeder as set forth in claim 21, further including a one-way clutch and a friction clutch operably coupled with the conveyor drive shaft.

23. The plate feeder as set forth in claim 22, further including a motor including a rotatable shaft for driving the crank assembly, the crank assembly including:
- a crank coupled with the motor shaft; and
- a ratio bar operably coupled between the crank and the clutches for rotating the one-way clutch and the friction clutch in the first direction and for subsequently rotating the friction clutch in the second direction.

24. The plate feeder as set forth in claim 23, the ratio bar being pivotally mounted about a pivot axis and operably coupled with the crank by a first tie rod, operably coupled with the one-way clutch by a second tie rod, and operably coupled with the friction clutch by a third tie rod.

* * * * *